United States Patent

[11] 3,584,473

[72] Inventors Donald C. MacDonald
Ridgewood;
Edgar Francois, Wayne, both of, N.J.
[21] Appl. No. 878,048
[22] Filed Nov. 19, 1969
[45] Patented June 15, 1971
[73] Assignee Uniroyal, Inc.
New York, N.Y.

[54] FORCE-TRANSMITTING SYSTEMS
32 Claims, 16 Drawing Figs.

[52] U.S. Cl. .................................................... 64/2,
287/114
[51] Int. Cl. ....................................................... F16c 1/02
[50] Field of Search ............................................ 64/2, 15, 7;
287/124, 20.3, 114

[56] References Cited
UNITED STATES PATENTS
| | | | |
|---|---|---|---|
| 856,199 | 5/1907 | Albert .......................... | 287/114 |
| 979,985 | 12/1910 | Moorhead ..................... | 64/2 |
| 2,948,409 | 8/1960 | Dodge et al. ................. | 287/114 |

*Primary Examiner*—Mark M. Newman
*Assistant Examiner*—Randall Heald
*Attorney*—Norbert P. Holler

ABSTRACT: A force-transmitting system including a cylindrical fiber-reinforced resin tube to which stress is transferred simultaneously via both the outside and inside surfaces of the tube, is disclosed. The system utilizes a drivable fitting which includes an external radially contractable circumferential arrangement of axially extending elongated wedge elements within a rigid conically bored coupling sleeve and an either internal radially expansible circumferential arrangement of elongated axially extending wedge elements or an internal rigid and nondeformable cylinder, defining between the outer and the inner structures an annular cylindrical space in which one end region of the tube wall can be received and radially clamped. Distribution of stress transfer over the entire expanse of the clamped portion of the tube is provided for by means of a pair of substantially coextensive, circumferentially continuous, uniform thickness layers of elastomeric material bonded to the outside and inside tube surfaces, respectively.

FORCE-TRANSMITTING SYSTEMS

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

This invention relates to force-transmitting systems utilizing elongated cylindrical tubes of fiber-reinforced resin. As used herein, the term "fiber-reinforced" is intended to designate both filament-wound and fiber-filled as well as fabric-reinforced resin structures.

Although the use of metallic bars, rods and tubes as force-transmitting members is well known, the use of such members made of fiber-reinforced resin may be highly desirable in any number of applications, for example if reducing the weight of the force transmitting member without adversely affecting its strength is an important consideration. Especially in the case of reinforced resin tubes, however, problems have been encountered in effecting a positive connection of the driving member to such a tube, and in preventing failure of the tube in the region of the connection under the applied stresses. Also, a resin/fiber tube requires a distribution of the applied stresses over a much larger area of the tube surface than does a metal tube.

As disclosed in the copending application of E.C. Uhlig and E. Francois, filed concurrently herewith and assigned to the same assignee as the instant application, it is possible effectively to overcome these problems by the provision, in a force transmitting system utilizing a cylindrical fiber-reinforced resin tube as the force transmitting member, of a pair of substantially coextensive, circumferentially continuous, uniform thickness layers of elastomeric material bonded to the inside and outside tube surfaces, and a clamping system including an external rigid coupling sleeve and an internal radially expansible circumferential arrangement of wedge elements, the tube portion bearing the stress transfer-distributing elastomer layers being received in the annular space defined about the set of wedge elements, and an expansible metal liner sleeve being bonded to the inner surface of the inner elastomer layer to prevent the latter from being extruded between the wedge elements. The instant invention represents a modification of the Uhlig-Francois system.

It is in particular an object of the present invention to provide a novel construction of the tube clamping fitting for a force transmitting system of the type disclosed in the aforesaid Uhlig-Francois application.

Generally speaking, in accordance with the present invention the drivable fitting by which the force to be transmitted is transferred to the cylindrical fiber-reinforced resin tube simultaneously from both the outside and inside surfaces of the tube, includes a rigid metal coupling sleeve having a conical inner surface and a radially contractable circumferential arrangement of elongated wedge elements axially slidably located therewithin and keyed thereto, the series of wedge elements constituting a split tubular structure having a cylindrical inner configuration. Arranged internally of the said wedge elements is either a radially expansible second circumferential set of wedge elements constituting a split tubular structure having a cylindrical outer configuration or a rigid nondeformable cylinder, so as to define about the internal structure an annular space to receive the end region of the fiber-reinforced resin tube. Where wedge elements constitute the external and internal structures of the fitting, a cup-shaped end cap is secured to the coupling sleeve at one end thereof and bridges the open end of the resin tube, and the inner wedge elements are independently keyed to the inner face of the end cap for a limited degree of radial sliding movement, a conical draw rod located interiorly of the internal set of wedge elements and activatable exteriorly of the end cap serving to effect both the outward displacement of these wedge elements and the joint inward displacement of the external wedge elements utilized for effecting the clamping action. Where a nondeformable cylinder constitutes the internal structure, an annular screw, located within the coupling sleeve and activatable by means of a spanner wrench or the like through suitable openings provided in the overlying end flange of the cylinder, serves to effect the inward movement of the external wedge elements for the clamping action.

As in the Uhlig-Francois system, of course, both the coupling sleeve and the associated end cap or end flange are externally hexagonal, splined or otherwise arranged to provide for a positive driving connection of a correspondingly constructed output member or force applying means of a power source to the cap and the coupling sleeve, and distribution of stress transfer over the entire length of the clamping portion of the fitting is achieved by means of a pair of substantially coextensive, circumferentially continuous, uniform thickness layers of elastomeric material bonded to the outside and inside surfaces, respectively, of the fiber-reinforced resin tube. A respective deformable metal liner sleeve, which is bonded to the surface of each elastomer layer facing a set of wedges, serves to prevent such layer from being extruded between the associated wedge elements, and the surfaces of the latter facing an associated liner sleeve are knurled, serrated or otherwise roughened for positive gripping engagement with the same.

The foregoing and other objects, characteristics and advantages of the present invention will be more clearly understood from the following detailed description thereof when read in conjunction with the accompanying drawings, in which:

FIGS. 7 and 8 are sectional views taken along the line 7–7 in FIG. 4 and illustrate different stages of operation of the fitting;

FIG. 9 is a sectional view taken along the line 9–9 in FIG. 4;

FIG. 13 is an exploded perspective view of the structure shown in FIG. 12;

Although, as in the Uhlig-Francois system, the present invention is of general utility insofar as the transmission of forces is concerned, for the sake of simplicity the following description will in the main also concern itself with a torque transmission system designed for use in a variety of applications such as land vehicles, including tanks, trucks and automobiles, aircraft, various types of machinery, and the like, where the use of torsion bars is required.

Figures 1, 2, 3, 4:
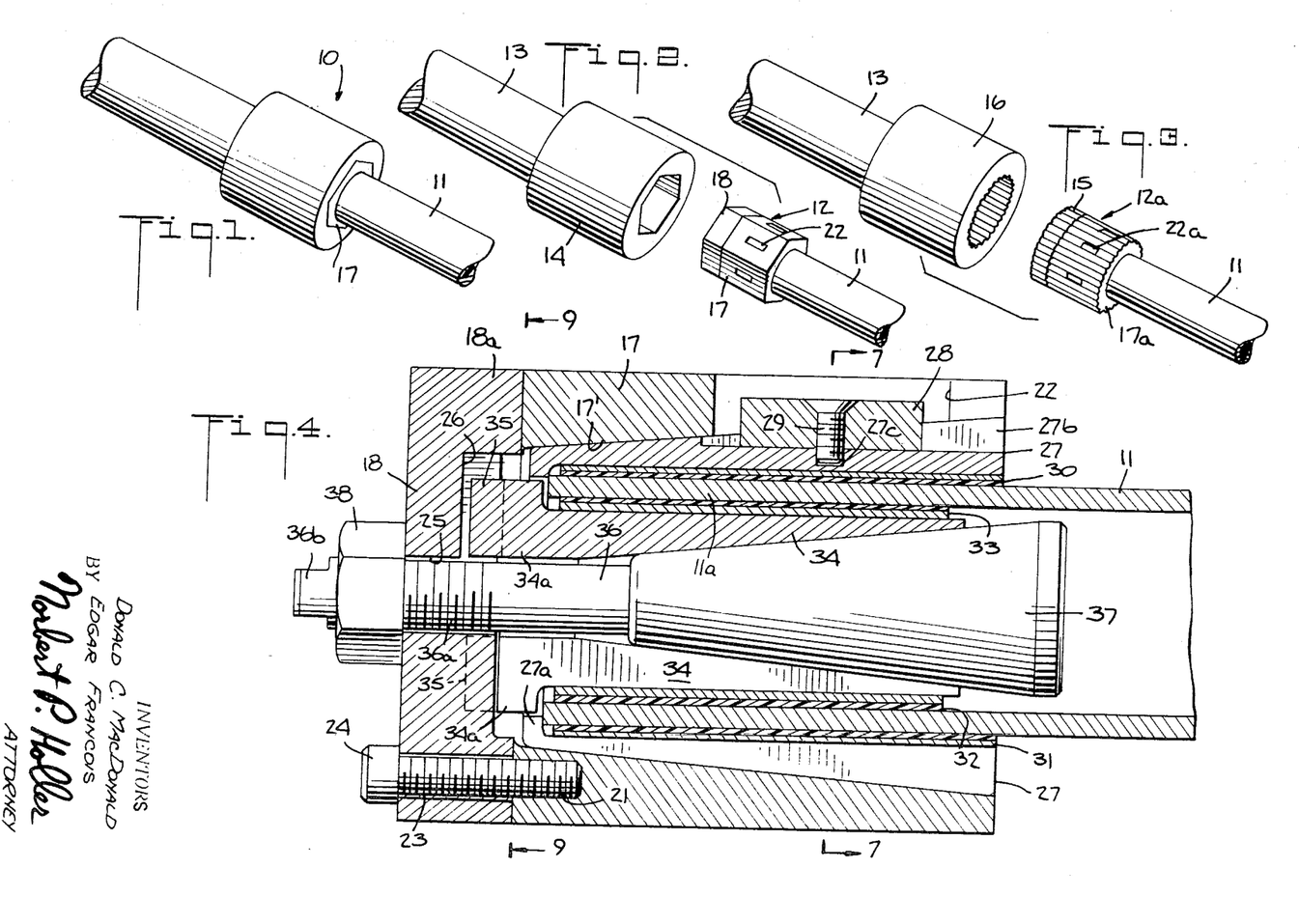
FIG. 1 is a fragmentary perspective view of a force-transmitting system of the type referred to and shows a drive member coupled to a fiber-reinforced resin tube by means of a force-transferring fitting according to one embodiment of the present invention.
FIG. 2 is an exploded fragmentary perspective view of the force-transmitting system shown in FIG. 1 and illustrates the exterior configuration of the fitting.
FIG. 3 is a view similar to FIG. 2 of a force transmitting system having a somewhat modified exterior configuration of the fitting.
FIG. 4 is a fragmentary longitudinal section through the tube and fitting of the system shown in FIGS. 1 and 2, the view being taken along the line 4—4 in FIG. 7.

Referring now first to FIGS. 1 to 9 of the drawings in greater detail, the torque-transmitting system 10 shown in FIGS. 1 and 2 comprises a fiber-reinforced resin torsion tube 11 (for example a filament-wound glass fiber and epoxy resin tube, with the reinforcement being omitted from the drawings for the sake of clarity) and a fitting 12 clamped, in a manner to be more fully described presently, to one end region 11a of the torsion tube 11, the fitting being shown to have an external hexagonal shape so as to provide for a positive driving connection of a drive member 13, e.g. a shaft or axle connected with the main power source (not shown), to the fitting by means of a correspondingly internally hexagonal socket-shaped extension 14 of the member 13. It will, of course, be understood that such connection may be effected by other and equivalent means, for example by the provision of a fitting 12a (FIG. 3) having external splines 15 to coact with an internally splined socket 16 of the drive member, or by locking the socket portion of the drive member to the fitting, in a manner not explicitly illustrated, by means of bolts, pin and slot connections, etc. Other than in the interlocking feature, however, the fitting 12a (and likewise any other equivalent fitting) is identical to the fitting 12, and the following detailed description of the latter will apply as well to the former.

The fitting 12 comprises a rigid metal tubular coupling sleeve 17 and a cup-shaped end cap 18 FIGS. 2 and 4 to 6) both of which are externally identically hexagonal, with the sleeve further having a conical inner surface 17' of a diameter which increases in the direction away from the end cap 18. In its thicker end the sleeve 17 is provided with a pair of diametrically opposed smooth holes 19 (FIG. 5) adapted to receive a pair of dowel pins 20 (FIGS. 5 and 6) secured in corresponding positions to the rim 18a of the end cap 18, and with four circumferentially spaced tapped holes 21. Near its thinner end, the coupling sleeve 17 is further provided in its side with a plurality of substantially rectangular radial openings 22 which are uniformly spaced from one another circumferentially of the sleeve and each of which is located midway between the longitudinal side edges of a respective one of the flat portions of the outer sleeve surface. (In the splined coupling sleeve 17a of the fitting 12a, of course, the corresponding openings 22a (FIG. 3) are merely spaced equidistantly around the circumference of the sleeve). The end cap is further provided with four circumferentially spaced openings 23 in its marginal or rim region to enable suitable bolts or screws 24 to be passed therethrough and threaded into the corresponding holes 21 to secure the end cap to the coupling sleeve. The end cap 18 is also provided in its transverse web with an axial opening or throughbore 25 and at the interior surface of the web with a plurality of radial keyways 26.

Figures 5, 6:
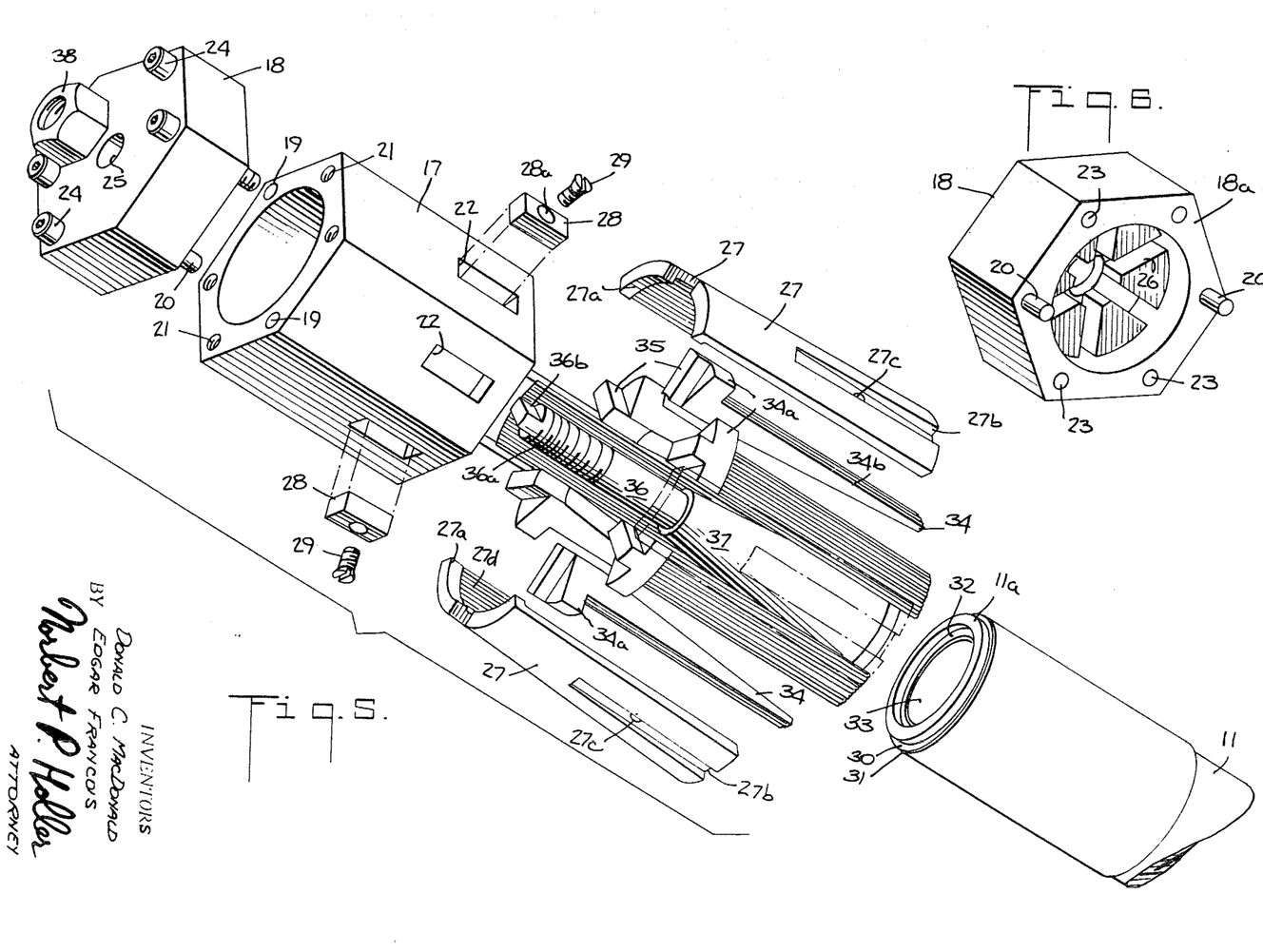
FIG. 5 is an exploded perspective elevational view of the structure shown in FIG. 4.
FIG. 6 is a different perspective view of the end cap of the fitting to show details of the interior construction thereof.
Figures 5, 6, 7:
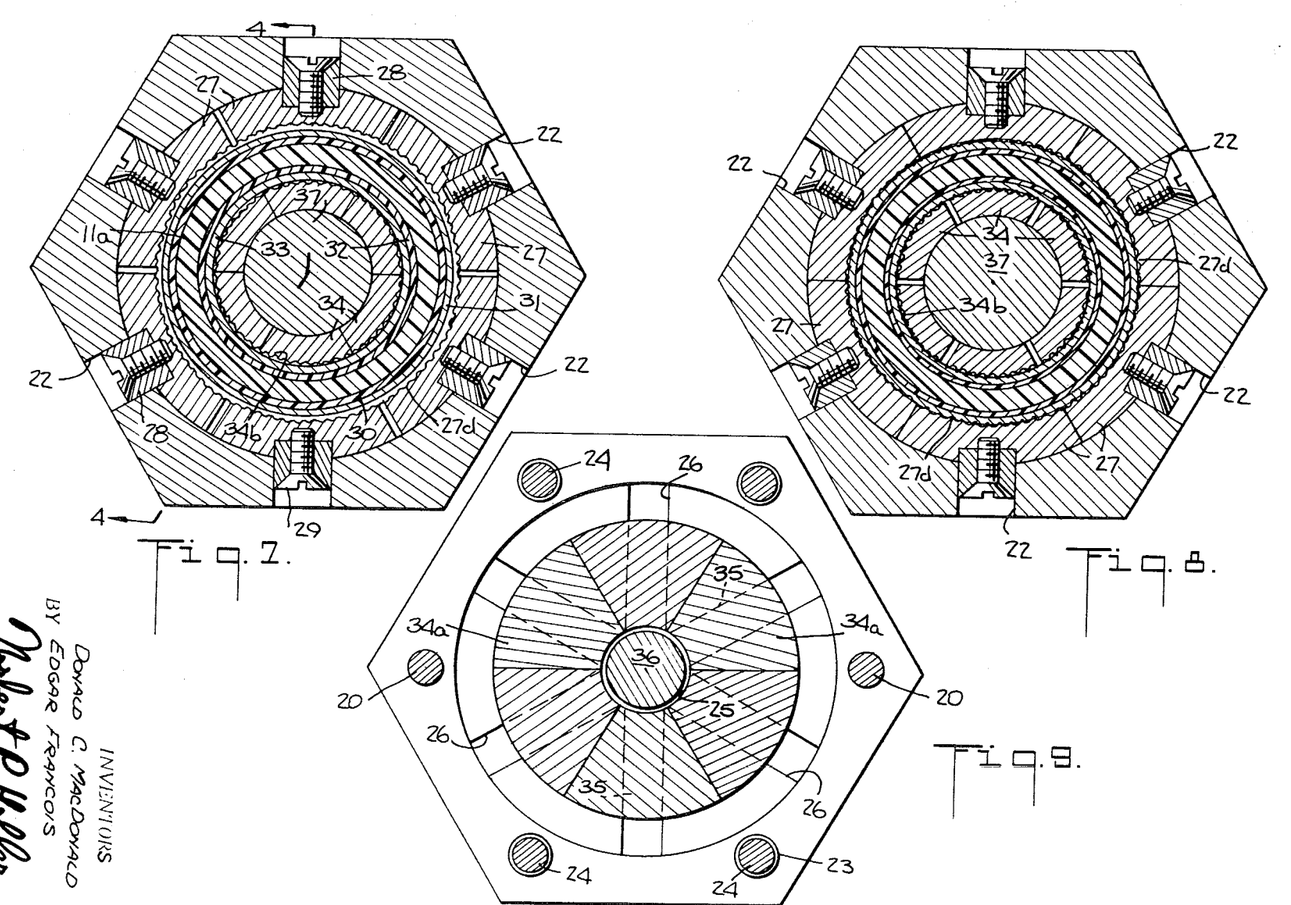
Figures 10, 11, 12:
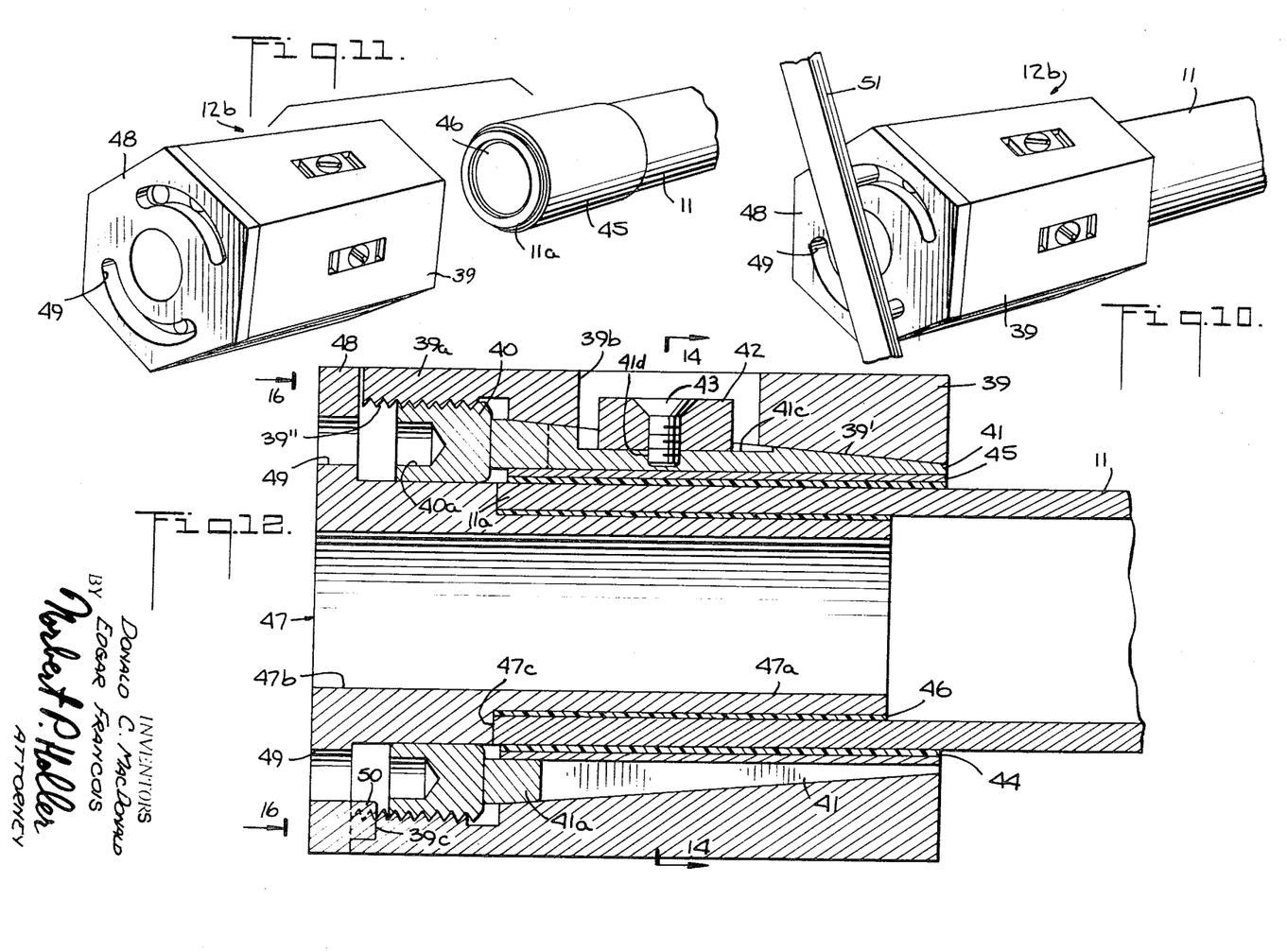
FIG. 10 is a perspective elevational view of a fiber-reinforced resin tube and a force-transferring fitting according to another embodiment of the present invention, and illustrates means for operating the fitting in effecting the clamping action.
FIG. 11 is an exploded perspective elevational view of the tube and fitting shown in FIG. 10.
FIG. 12 is a fragmentary longitudinal section through the tube and fitting shown in FIGS. 10 and 11, the view being taken along the line 12–12 in FIG. 14.

Arranged within the confines of the coupling sleeve 17 (or 17a) is a radially contractable means adapted to exert a clamping pressure against the tube 11 from the outside. In the illustrated embodiment of the present invention, this means is in the form of a longitudinally split tubular structure having a conical outer and a cylindrical inner surface configuration and constituted by a circumferential arrangement of a plurality of elongated rigid metal wedge-shaped elements 27 of circularly arcuate cross section (see FIGS. 5, 7 and 8) which increase in thickness in the direction away from the end cap 18. At their thinnest ends, the wedge elements have radially inwardly extending transverse flanges 27a which together define an end flange of the split tubular structure adapted to be engaged by the proximate open end of the torsion tube 11 (FIG. 4). The wedge elements are further provided in their radially outwardly directed surfaces with respective longitudinal grooves or keyways 27b each of essentially the same width as the various openings 22 in the coupling sleeve 17. Each wedge element has associated therewith a key 28 which is fastened thereto by means of a screw 29 extending through a hole 28a in the key and threaded into a tapped hole 27c in the bottom of the groove 27b. The various keys extend with a smooth radial and axial sliding fit into the respective openings 22 in the coupling sleeve and thus are secured to the latter against rotational movement relative thereto. On their radially inwardly facing surfaces, the wedge elements 27 are longitudinally serrated, knurled or otherwise roughened, as shown at 27d (FIGS. 5, 7 and 8). The manner in which the so far described external clamping structure of the fitting 12 performs its function will become clear as the description proceeds.

In its operational setting (FIGS. 4, 7 and 8), the fitting 12, as in the system disclosed in the aforesaid Uhlig-Francois application, is mounted on the end region 11a of the torsion tube 11, with the end cap 18 bridging the open end of the tube, and with the coupling sleeve 17 being disposed in surrounding relation to a circumferentially continuous thin layer 30 of elastomeric material, e.g. a suitable polyurethane or cis-polybutadiene composition, which is cemented by an adhesive, e.g. a suitable epoxy resin composition, to the outer surface of the end region 11a of the torsion tube. A thin deformable metallic liner sleeve 31 is cemented to the outer surface of the elastomer layer 30 for a purpose which will be more fully explained presently. A substantially coextensive circumferentially continuous thin layer 32 of preferably the same elastomeric material is similarly cemented to the inner surface of the torsion tube 11 in the said end region thereof, and an expansible thin metal liner sleeve 33 is cemented to the inner surface of the layer 32. Both elastomer layers are of uniform thickness throughout their entire expanse and thus may be considered as cylindrical layers, and both liner sleeves may be made of about 0.010 inch thick aluminum.

In accordance with one aspect of the present invention, the external clamping structure 17/27 etc. may be associated with an internal clamping structure identical with that disclosed in the Uhlig-Francois application, for the purpose of connecting the tube 11 and fitting 12 to one another secure against slippage. To this end, therefore, there is provided interiorly of the liner sleeve 33 a radially expansible means in the form of a longitudinally split tubular structure having a cylindrical outer and a conical inner surface configuration and constituted by a circumferential arrangement of a plurality of elongated rigid metal wedge-shaped elements 34 of circularly arcuate cross section (see FIGS. 5, 7 and 8) which decrease in thickness in the direction away from the end cap 18. At their thickest ends the wedge elements 34 have enlarged transverse shoulders or flanges 34a (FIG. 4) which together define a radially outwardly projecting end flange on the split tubular structure (see also FIG. 6) and from the end faces of which project respective radial keys 35 radially slidably received in the keyways 26 in the end cap. The wedge elements are preferably longitudinally knurled or otherwise roughened on their exterior surfaces facing the metal liner sleeve, as shown at 34b (FIGS. 5, 7 and 8).

Coaxially interiorly of the set of wedge elements 34 is disposed a draw rod 36 (FIGS. 4 and 5) having a conical body section 37 which increases in thickness in the direction away from the end cap and located in the conical space defined by the wedge elements 34. The draw rod extends freely through the space defined by the thickest portions of the wedge elements, has a threaded end section 36a extending through the axial bore 25 in the end cap 18, and terminates in a flat-faced end projection 36b. A nut 38 is threaded onto the draw rod section 36a exteriorly of the end cap and bears against the latter.

In the use of the torque transmission system 10, the end region 11a of the torsion tube 11, together with the elastomer layers 30 and 32 and the liner sleeves 31 and 33 carried thereby, is initially telescoped into the annular space defined between the inner cylindrical surface of the external tubular structure defined by the wedge elements 27 and the outer cylindrical surface of the split tubular structure defined by the wedge elements 34. The various parts of the fitting at that time are in the positions thereof shown (in a somewhat exaggerated form) in FIG. 7, with the wedges 27 slightly separated circumferentially and with the wedges 34 circumferentially closed. The conical section 37 of the draw rod is then pulled axially toward the end cap, for example by rotating the nut 38 while clamping the extension 36b of the draw rod to hold the latter against rotation, to effect a slight radially outward displacement of the wedge elements toward the coupling sleeve. This movement of the draw rod, as can be seen from FIG. 4, will cause an equal and opposite movement of the end cap/coupling sleeve entity, which, since longitudinal movement of the outer wedge elements 27 in the same direction is inhibited by the engagement between the flanges 27a and the end of the torsion tube 11, causes the wedge elements to be displaced radially inwardly toward the draw rod. The movements will be sufficient to bring the parts to the positions thereof shown in FIG. 8, with the outer wedges now circumferentially almost or fully closed while the inner wedges are circumferentially slightly opened. As a result, the tube wall is firmly clamped against the outer wedges and the coupling sleeve via the elastomer layers 30 and 32. The principal function of the liner sleeves 31 and 33 thus is seen to be to prevent the elastomer layers from being extruded or pinched between the wedges of the respective outer and inner tubular structures as the latter are shifted in the manner described. As the clamping pressures are applied, of course, the teeth 27d and 34b on the wedge elements bite into the respective liner sleeves and thereby assist in the transfer of stress to the latter and the prevention of any slippage between the wedge elements and the liner sleeves.

The end of region 11a of the torsion tube having the fitting 12 clamped thereto and the socket end 14 of the drive member or power shaft 13 are then telescoped one into the other. Upon rotation of the drive member, therefore, torque will be transferred into the torsion tube simultaneously via both the outside and inside surfaces thereof, the line of action in the one case being from the socket 14 directly to the coupling sleeve 17 and thence via the keys 28, the outer wedge elements 27, the liner sleeve 31, and the outer elastomer layer 30 to the outside tube surface, and in the other case being independently thereof from the socket directly to the end cap 18 and thence via the keyways 26, the keys 35, the inner wedge elements 34, the liner sleeve 33 and the inner elastomer layer 32 to the inside tube surface. No torque is transferred from the end cap to the coupling sleeve or vice versa, the pins 20 and bolts 24 serving only to secure the end cap and coupling sleeve to one another in proper alignment. The elastomer layers must, of course, be of a thickness adequate to compensate for the differential strains between the metal parts of the fitting and the filamentary reinforcement of the resin torsion tube resulting from the differences in the elongation properties of the respective materials, and also to assure a distribution of the stress transfer over the entire expanse of the clamped end region of the torsion tube. For example, a thickness of 0.006 inch for the elastomer layers may be used advantageously in the case of a 1-inch-diameter filament-wound glass fiber and epoxy resin tube. For larger tubes, the layer thickness would have to be increased in proportion to the increase in diameter.

In accordance with another aspect of the present invention, the clamping of a force-transferring fitting to the torsion tube may be effected by means of an external wedging action alone rather than by cooperating internal and external wedging as described hereinbefore. For a force-transmitting system utilizing such an arrangement, the force-transferring fitting 12b FIGS. 10 to 13) comprises a coupling sleeve 39 having a conical interior space 39' over the major portion of its length. At its widest end, the space 39' merges into a cylindrical space defined in an end section 39a of the coupling sleeve which, in that section, is provided with internal threads 39''. The coupling sleeve 39 is externally hexagonal and is provided with a plurality of circumferentially spaced rectangular radial openings 39b each of which is located midway between the longitudinal side edges of a respective one of the flat portions of the outer sleeve surface. In the end edge of the section 39a, the coupling sleeve is further provided with a plurality of circumferentially spaced interior surface recesses or notches 39c, each preferably located in a respective one of the "corner" regions of the sleeve. An externally threaded ring 40 is screwed into the coupling sleeve section 39a and has a plurality of circumferentially spaced holes 40a in its outwardly directed face.

Figures 14, 15, 16:
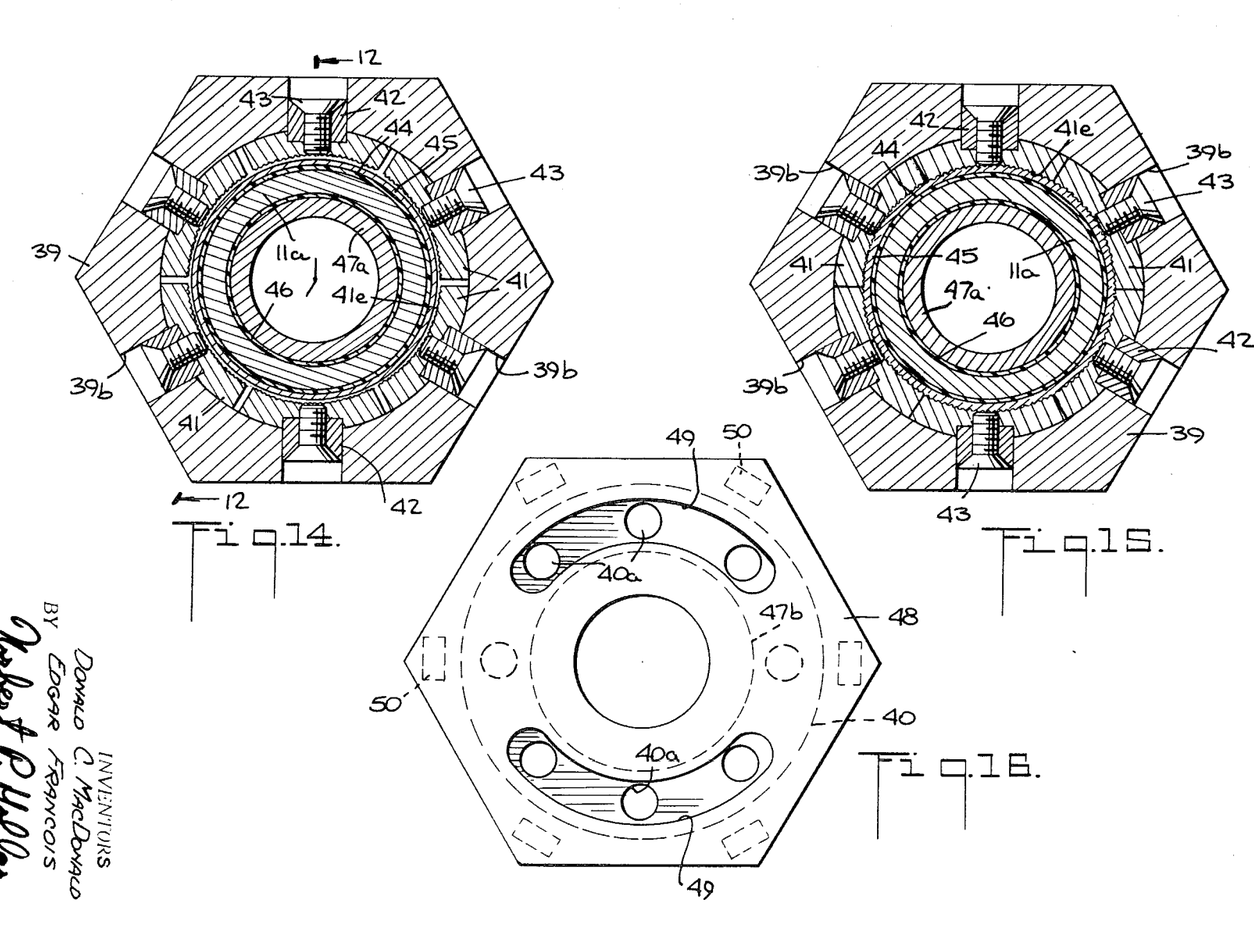
FIGS. 14 and 15 are sectional views taken along the line 14–14 in FIG. 12 and illustrate different stages of operation of the fitting.
FIG. 16 is an end elevational view taken along the line 16–16 in FIG. 12.
Figure 18:
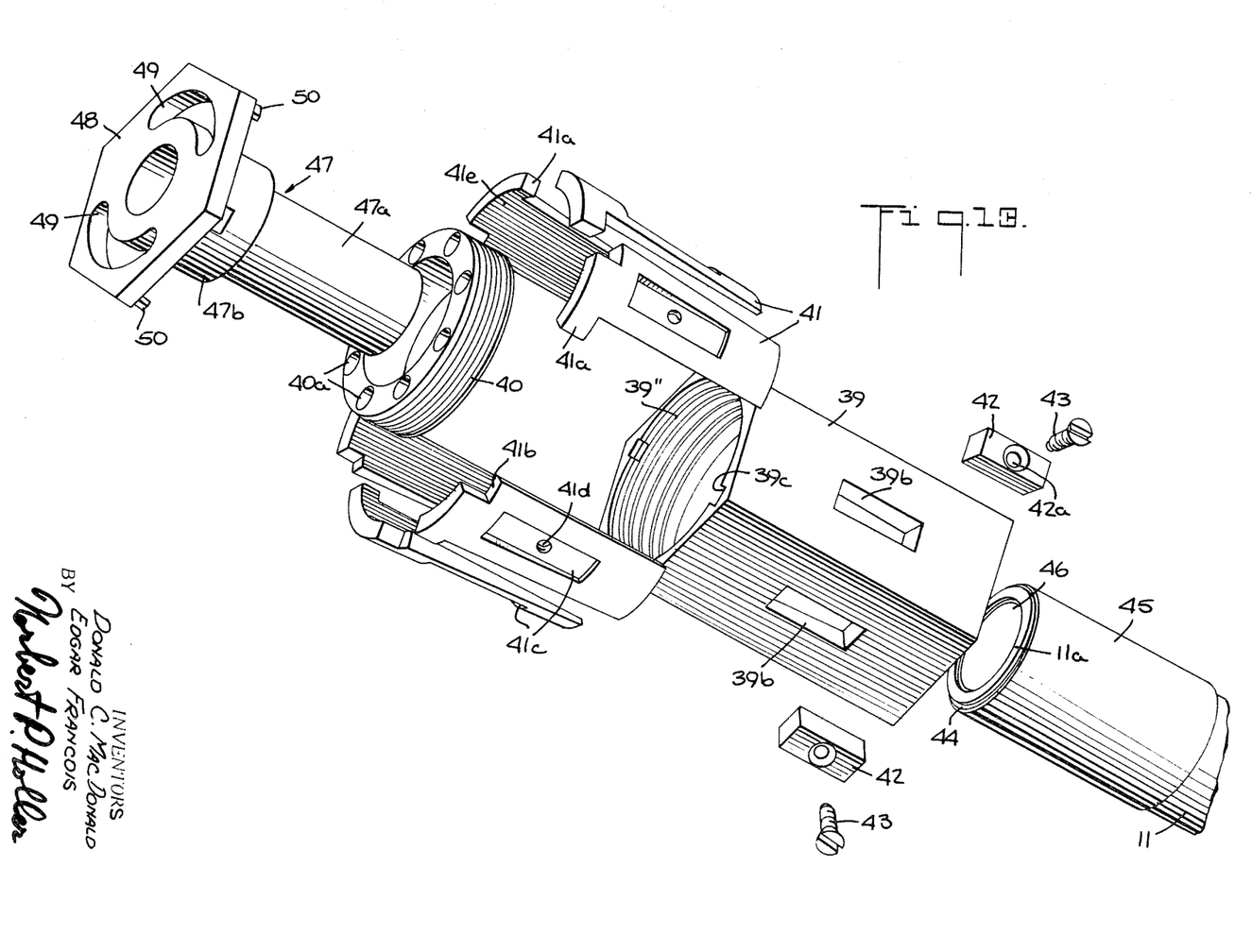

Arranged within the confines of the conical space 39' in the coupling sleeve 39 is a radially contractable means adapted to exert the clamping pressure against the fiber-reinforced resin tube 11 from the outside. In a manner analogous to the previously described embodiment of the invention, this means is in the form of a longitudinally split tubular structure having a conical outer and a cylindrical inner surface configuration and constituted by a circumferential arrangement of a plurality of elongated rigid metal wedge-shaped elements 41 of circularly arcuate cross section (see FIGS. 13—15) which at one end slidably engage the inwardly directed face of the ring 40 and decrease in thickness in the direction away from the ring. At their thickest ends, each of the wedge elements 41 is provided with a lateral protuberance 41a at one side and a corresponding lateral recess 41b at the other side, so as to enable a positive interfitting of the set of wedge elements. The wedge elements are further provided in their radially outwardly directed surfaces with respective longitudinal grooves or keyways 41c, each of essentially the same width as a respective one of the set of openings 39b. Each wedge element has associated therewith a key 42 which is fastened thereto by means of a screw 43 extending through a hole 42a in the key and threaded into a tapped hole 41d in the bottom of the respective groove 41c. The various keys extend with a smooth radial and axial sliding fit into the respective openings 39b in the coupling sleeve and thus are secured to the latter against rotational movement relative thereto. On their radially inwardly facing surfaces, the wedge elements 41 are longitudinally serrated, knurled and otherwise roughened, as shown at 41e.

The inner diameter of the tubular structure defined by the wedge elements 41 is slightly greater than the outer diameter of the torsion tube 11, so as to accommodate the latter and a thin elastomer layer 44 cemented to the outer surface of the tube end region 11a and a surrounding thin deformable metallic liner sleeve 45 cemented to the outer surface of the layer 44. A like and substantially coextensive thin layer 46 of elastomeric material is cemented to the inner surface of the torsion tube end region 11a. The elastomer layers 44 and 46 and the liner sleeve 45, as well as the cement used, should be of the same physical properties as the corresponding elements in the first embodiment described herein.

The fitting 12b further includes a rigid metallic cylinder 47 which has a first section 47a, the outer diameter of which is slightly less than the inner diameter of the torsion tube end region 11a, and the axial length of which is substantially coextensive with the length of the inner elastomer layer 46. The second section 47b of the cylinder 47 is of somewhat increased outer diameter, preferably substantially equal to the inner diameter of the ring screw 40, and provides a radial shoulder 47c (FIG. 12) adapted to constitute an abutment for the open end of the clamped region 11a of the torsion tube 11. At the free end of the section 47b, the cylinder 47 terminates in an integral, radially outwardly extending, rigid flange 48 which is provided with a pair of coextensive circularly curved slots 49 (FIGS. 12, 13 and 16) extending therethrough. The flange 48 has an external hexagonal configuration identical to that of the coupling sleeve 39 and is provided in the corner regions of its face directed toward the coupling sleeve with a plurality of lugs or projections 50 adapted to fit into the corresponding notches in the section 39a of the coupling sleeve. The lugs 50 and notches 39c, like the bolts 24 in the embodiment previously described, serve only to ensure proper alignment of the coupling sleeve 39 and the flange 48 but not to transmit any torque between the sleeve and flange. Both the coupling sleeve and the cylinder flange may be externally splined, for example as shown in FIG. 3, or otherwise constructed to facilitate the connection thereof to the power source as previously described.

In the use of a torque transmission system utilizing the fitting 12b, the end region 11a of the torsion tube 11, together with the elastomer layers 44 and 46 and the liner sleeve 45, is initially telescoped into the annular space defined between the inner cylindrical surface of the external split tubular structure defined by the wedge elements 41 and the outer surface of the section 47a of the cylinder 47. The various parts of the fitting at that time are in the positions thereof illustrated (in a somewhat exaggerated form) in FIG. 14, with the wedges 41 slightly separated circumferentially. The ring screw 40 then is rotated relative to the coupling sleeve in the appropriate direction, for example by means of a spanner wrench 51 (FIG. 10) or like suitable tool, to cause the coupling sleeve to be drawn up somewhat, thereby to effect a slight radially inward displacement of the wedge elements toward the cylinder section 47a. The movement will be sufficient to bring the parts to the positions thereof illustrated in FIG. 15, with the wedges now circumferentially almost or fully closed. As a result, the tube wall is firmly clamped against the cylinder via the elastomer layers 44 and 46, with the liner sleeve 45, as before, keeping the elastomer layer 44 from being pinched between the wedge elements 41 as the latter are shifted in the manner described. Also as before, as the clamping pressure is applied, the knurls or serrations 41e on the wedge elements bite into the liner sleeve and thereby assist in the transfer of stress to the latter and the prevention of any slippage between the wedge elements and the liner sleeve.

The end region 11a of the torsion tube having the fitting 12b clamped thereto is then telescoped into the correspondingly constructed socket end (such as 14, 16 etc.) of the drive member or power shaft 13. Upon rotation of the drive member, therefore, torque will be transferred, with an appropriate distribution of stress transfer, into the torsion tube simultaneously via both the outside and inside surfaces thereof, the line of action in the one case being from the socket directly to the coupling sleeve and thence via the keys 42, the wedge elements 41, the liner sleeve 45 and the outer elastomer layer 44 to the outside tube surface, and in the other case being independently thereof from the socket directly to the flange 48 and thence via the cylinder 47 and the inner elastomer layer 46 to the inside tube surface.

The present invention thus also, like the aforesaid Uhlig-Francois system, enables straight-surfaced fiber-reinforced resin tubes of uniform wall thickness to be used as torque-transmitting members, by virtue of the fact that the presence of the inner and outer elastomer layers on the tube surfaces in conjunction with the transfer of stress into the tube simultaneously via both surfaces serves to prevent stress concentrations and eliminates the need for increasing the tube end wall thickness so as to compensate for such stress concentrations, which not only prolongs the useful service life of the tube but increases its torque capability as well.

As will be readily apparent, the principles of the present invention are also applicable to the transmission of other types of forces than torque, e.g. bending, pushing and pulling forces. In any such system, however, some slight modifications of certain structural elements of the clamp fitting may be required. Merely by way of example, for the transmission of pulling or bending forces, nonlongitudinal (e.g. circumferential, spiral, crisscross, etc.) knurling or serrations would have to be provided on the wedge elements, and the fitting and socket would have to be bolted or screwed or otherwise axially nonslidably locked together, rather than being interlocked by means of a "hex" or splined connection. Under certain conditions, furthermore, for example where relatively high pulling forces are to be transmitted, it may also be found advisable to modify the key and keyway construction for the internal wedges, as by a dovetail arrangement or the like, so as to enable it better to support such forces.

It will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

Having thus described the invention, what I claim and desire to be protected by Letters Patent is:

1. A force-transmitting system, comprising a cylindrical, open-ended, fiber-reinforced resin tube having first and second substantially coextensive, circumferentially continuous layers of elastomeric material bonded to respective mutually overlying regions of the inner and outer tube surfaces, each of said layers being of uniform thickness throughout its expanse, and a force transferring fitting having external radially contractable means and a concentric internal structure defining an annular space about the latter in which the portion of said tube carrying said elastomer layers is received, said tube being clamped to said fitting upon activation of said contractable means to press said tube inwardly via said elastomer layers against said internal structure.

2. A force-transmitting system, comprising a cylindrical, open-ended, fiber-reinforced resin tube, first and second substantially coextensive, circumferentially continuous layers of elastomeric material bonded to respective mutually overlying regions of the inner and outer surfaces of said tube, each of said layers being of uniform thickness throughout its expanse, a rigid metal tubular coupling sleeve concentrically surrounding said tube and said second layer, radially contractable means with a cylindrical inner surface configuration disposed interiorly of said coupling sleeve and in surrounding relation to the outer surface of said second elastomer layer for applying inwardly directed pressure to said tube in the region of said second elastomer layer, radially expansible means located interiorly of said tube and said first elastomer layer for applying outwardly directed pressure to said tube in the region of said first elastomer layers, means for interconnecting said contractable means and said coupling sleeve against relative rotational movement therebetween, means for selectively activating both said contractable and said expansible means, and means for enabling establishment of a joint driving connection between force-applying means and both said expansible means and said coupling sleeve, whereby upon contraction of said contractable means and expansion of said expansible means, thereby radially to clamp said tube therebetween, force may be transferred by said coupling sleeve, said contractable means and said second elastomer layer to the outer surface of said tube, and simultaneously but independently thereof by said expansible means and said first elastomer layer to the inner surface of said tube, said elastomer layers ensuring a distribution of stress transfer to said tube over the entire expanse of said overlying regions of said tube surfaces.

3. A force-transmitting system according to claim 2, said means for enabling the driving connection to be established comprising a rigid metal end cap secured to one end of said coupling sleeve and bridging the proximate open end of said tube, cooperable means on said end cap and said expansible means for restraining the same against displacement relative to one another in the direction of the force to be transmitted, and means on said coupling sleeve and said end cap adapted to coact with corresponding means on said force-applying means for interlocking the coupling sleeve/end cap entity and said force-applying means against displacement relative to one another in the direction of the force to be transmitted.

4. A force-transmitting system according to claim 3, said expansible means comprising a plurality of elongated first wedge-shaped elements of circularly arcuate cross section extending axially along and in side by side configuration interiorly of said tube, said first elements decreasing in thickness in the direction away from said end cap and conjointly defining a first split tubular structure having a cylindrical exterior configuration and a conical interior space which increases in diameter in the direction away from said end cap, said end cap being provided with an axial opening and with a plurality of radial keyways in its interior surface facing said open end of said tube, each of said first elements at its thickest portion just outside said open end of said tube having a key structure radially slidably received in a respective one of said keyways in said end cap, said coupling sleeve having an interior conical surface which increases in diameter in the direction away from said end cap, said contractable means comprising a plurality of elongated second wedge-shaped elements of circularly arcuate cross section extending axially along and in side by side configuration about said tube, said second elements increasing in thickness in the direction away from said end cap and conjointly defining a second split tubular structure having a cylindrical interior configuration and a conical exterior configuration in sliding engagement with said conical interior surface of said coupling sleeve, each of said second elements at its thinnest end having a radially inwardly extending flange projecting over and engaging the open end edge of said tube, and said means for activating said contractable and said expansible means comprising a draw rod having a conical body section arranged coaxially within the confines of said conical space in said first tubular structure and having its widest portion juxtaposed to the thinnest portions of said first elements, said draw rod including an externally threaded end section extending through the space within the confines of the keyed thickest portions of said first elements and through said opening in said end cap, and a nut threaded on said end section of said draw rod at the exterior of said end cap and bearing against the latter to enable said conical body section of said draw rod, upon rotation of said nut relative to said draw rod in the appropriate direction, to be pulled toward said end cap, thereby to displace said first elements radially outwardly and said second elements radially inwardly to an extent sufficient to clamp the intermediate region of said tube tightly therebetween via said elastomer layers.

5. A force-transmitting system according to claim 4, said interlocking means comprising an external hexagonal configuration of both said coupling sleeve and said end cap.

6. A force-transmitting system according to claim 4, said interlocking means comprising an external splined configuration of both said coupling sleeve and said end cap.

7. A force-transmitting system according to claim 4, said interlocking means comprising an external threaded configuration of both said coupling sleeve and said end cap.

8. A force-transmitting system according to claim 4, said interconnecting means comprising a plurality of radial keys secured to said second elements, respectively, and a corresponding set of axially extending radial openings provided in said coupling sleeve, said radial openings accommodating said keys for axial and radial sliding movements only.

9. A force-transmitting system according to claim 4, further comprising first and second deformable metal liner sleeves overlying and bonded to said first and second elastomer layers, respectively, said first and second elements being roughened on those of their respective surfaces which face said liner sleeves for positive gripping engagement therewith.

10. A force-transmitting system, comprising a cylindrical, open-ended, fiber-reinforced resin tube, first and second substantially coextensive, circumferentially continuous layers of elastomeric material bonded to respective mutually overlying regions of the inner and outer surfaces of said tube, each of said layers being of uniform thickness throughout its expanse, a rigid metal cylinder located interiorly of said tube and said first elastomer layer, a rigid metal tubular coupling sleeve concentrically surrounding said tube, radially contractable means with a cylindrical inner surface configuration disposed interiorly of said coupling sleeve and in surrounding relation to the outer surface of said second elastomer layer for applying inwardly directed pressure to said tube in the region of said elastomer layers and clamping said tube to said cylinder via said elastomer layers, means for interconnecting said contractable means and said coupling sleeve against relative rotational movement therebetween, means for selectively activating said contractable means, and means for enabling establishment of a joint driving connection between force-applying means and both said cylinder and said coupling sleeve, whereby upon contraction of said contractable means, force may be transferred by said coupling sleeve, said contractable means and said second elastomer layer to the outer surface of said tube, and simultaneously but independently thereof by said cylinder and said first elastomer layer to the inner surface of said tube, said elastomer layers ensuring a distribution of stress transfer to said tube over the entire expanse of said overlying regions of said tube surfaces.

11. A force-transmitting system according to claim 10, said means for enabling the driving connection to be established comprising a rigid metal radially outwardly extending flange secured to said cylinder in bridging relation to the proximate open end of said coupling sleeve and against displacement relative to said cylinder in the direction of the force to be transmitted, and means on said coupling sleeve and said flange adapted to coact with corresponding means on said force-applying means for interlocking the coupling sleeve/flange entity and said force-applying means against displacement relative to one another in the direction of the force to be transmitted.

12. A force-transmitting system according to claim 11, said coupling sleeve having an interior surface a minor portion of which in the region adjacent said flange is cylindrical and internally threaded and the remainder of which is conical and decreases in diameter in the direction away from said flange, said cylinder further having a section of enlarged diameter located exteriorly of said tube and providing an annular shoulder serving as an abutment for said open end of said tube, said flange being rigidly secured to the end of said cylinder section remote from said shoulder and having at least one opening therethrough to provide access into said internally threaded portion of said coupling sleeve, said contractable means comprising a plurality of elongated wedge-shaped elements of circularly arcuate cross section extending axially along and in side by side configuration exteriorly of said tube and interiorly of said coupling sleeve, said elements decreasing in thickness in the direction away from said flange and conjointly defining a split tubular structure having a cylindrical interior configuration and a conical exterior configuration in sliding engagement with said conical interior surface of said coupling sleeve, and said means for activating said contractable means comprising an annular screw arranged coaxially about said enlarged diameter section of said cylinder within the confines of and screwed into said internally threaded portion of said coupling sleeve, said screw being provided with means engageable by a tool when the same is extended through said opening in said flange to enable said coupling sleeve, upon rotation of said screw relative thereto in the appropriate direction, to be pulled toward said flange for displacing said elements radially inwardly to an extent sufficient to clamp the corresponding region of said tube tightly against said cylinder via said elastomer layers.

13. A force-transmitting system according to claim 12, said interlocking means comprising an external hexagonal configuration of both said coupling sleeve and said flange.

14. A force-transmitting system according to claim 12, said interlocking means comprising an external splined configuration of both said coupling sleeve and said flange.

15. A force-transmitting system according to claim 12, said interlocking means comprising an external threaded configuration of both said coupling sleeve and said flange.

16. A force-transmitting system according to claim 12, further comprising a deformable metal liner sleeve overlying and bonded to said second elastomer layer, said elements being roughened on their respective surfaces which face said liner sleeve for positive gripping engagement therewith.

17. A clamp fitting for a force-transmitting system wherein a cylindrical, open-ended tube is used as the force-transmitting member, said fitting comprising a rigid metal tubular coupling sleeve with a conical interior surface, a plurality of elongated wedge-shaped elements of circularly arcuate cross section extending axially along and in side by side configuration interiorly of said coupling sleeve, said elements decreasing in thickness from one end to the other and conjointly defining a split tubular structure having a cylindrical interior configuration and a conical exterior configuration in sliding engagement with said conical interior surface of said coupling sleeve, an internal structure located coaxially with the confines of said tubular structure and having an exterior cylindrical configuration, said internal structure and said tubular structure defining therebetween an annular space adapted to receive the open end region of said tube, each of said elements having a key structure radially slidably received in a respective keyway in said coupling sleeve for interlocking the latter and said elements against rotational displacement relative to one another, a planar end structure connected with said internal structure so as to be nondisplaceable relative thereto in the direction of the force to be transmitted, and means for effecting an axial displacement of said coupling sleeve relative to said elements and in the direction of the largest diameter end of said conical surface of said coupling sleeve, for thereby displacing said elements radially inwardly toward said internal structure into clamping relation to said tube, so that upon application of said force to said coupling sleeve and said end structure, stress can be transferred simultaneously but independently into the inside and outside surfaces of a tube clamped between said internal structure and said elements.

18. A clamp fitting according to claim 17, further comprising a pair of substantially coextensive, circumferentially continuous, cylindrical, stress transfer distributing layers of elastomeric material adapted to be bonded to the inner and outer surfaces of said tube, each layer being of uniform thickness throughout its expanse.

19. A clamp fitting according to claim 18, further comprising a deformable metal liner sleeve adapted to be disposed in surrounding relation to and bonded to the outer surface of the outer one of said elastomer layers, said elements being roughened on their respective inwardly directed surfaces for positive gripping engagement with said liner sleeve.

20. A clamp fitting according to claim 17, both said coupling sleeve and said end structure having an external hexagonal configuration adapted to coact with a corresponding internal configuration of a force-applying means.

21. A clamp fitting according to claim 17, both said coupling sleeve and said end structure having an external splined configuration adapted to coact with a corresponding internal configuration of a force-applying means.

22. A clamp fitting according to claim 17, both said coupling sleeve and said end structure having an external threaded configuration adapted to coact with a corresponding internal configuration of a force-applying means.

23. A clamp fitting for a force-transmitting system wherein a cylindrical, open-ended tube is used as the force-transmitting member, said fitting comprising a rigid metal tubular coupling sleeve with a wall thickness which decreases from one end thereof to the other and a conical interior surface, a cup-shaped end cap secured at the rim thereof to the thickest end of said coupling sleeve, said end cap being provided with an axial opening and with a plurality of radial keyways in its interior surface facing the interior of said coupling sleeve, a plurality of elongated first wedge-shaped elements of circularly arcuate cross section extending axially along and in side-by-side configuration interiorly of said coupling sleeve, said first elements decreasing in thickness in the direction away from said end cap and conjointly defining a first split tubular structure having a cylindrical exterior configuration and a conical internal space which increases in diameter in the direction away from said end cap, a plurality of elongated second wedge-shaped elements of circularly arcuate cross section extending coaxially with and in side-by-side configuration about said first tubular structure, said second elements increasing in thickness in the direction away from said end cap and conjointly defining a second split tubular structure having a cylindrical interior configuration and a conical exterior configuration in sliding engagement with said conical interior surface of said coupling sleeve, said first and second tubular structures defining therebetween an annular space adapted to receive the open end region of said tube, each of said second elements at its thinnest end having a radially inwardly extending flange adapted to engage the open end edge of said tube and intermediate its ends being radially keyed to said coupling sleeve against relative rotational movement therebetween, each of said first elements at its thickest portion having a key structure radially slidably received in a respective one of said keyways for interlocking said end cap and said first elements against displacement relative to one another in the direction of the force to be transmitted, a draw rod having a conical body section arranged coaxially within the confines of said conical space in said first tubular structure and having its widest portion juxtaposed to the thinnest portions of said first elements, said draw rod including an externally threaded end section extending through the space within the confines of the keyed thickest portions of said first elements and through said opening in said end cap, and a nut threaded on said end section of said draw rod at the exterior of said end cap and bearing against the latter to enable said conical body section of said draw rod, upon rotation of said nut relative to said draw rod in the appropriate direction, to be pulled toward said end cap for displacing said first elements radially outwardly and said second elements radially inwardly, whereby upon application of said force to said coupling sleeve and said end cap, stress can be transferred simultaneously but independently into the inside and outside surfaces of a tube clamped between said first and second tubular structures.

24. A clamp fitting according to claim 23, both said coupling sleeve and said end cap having an external hexagonal configuration adapted to coact with a corresponding internal configuration of a force-applying means.

25. A clamp fitting according to claim 23, both said coupling sleeve and said end cap having an external splined configuration adapted to coact with a corresponding internal configuration of a force-applying means.

26. A clamp fitting according to claim 23, both said coupling sleeve and said end cap having an external threaded configuration adapted to coact with a corresponding internal configuration of a force-applying means.

27. A clamp fitting according to claim 23, further comprising a pair of substantially coextensive, circumferentially continuous, cylindrical, stress transfer distributing layers of elastomeric material adapted to be bonded to the inner and outer surfaces, respectively, of said tube, each of said layers being of uniform thickness throughout its expanse, and a pair of deformable metal liner sleeves adapted to be bonded, respectively, to the inner surface of the inner elastomer layer and the outer surface of the outer elastomer layer, said first and second elements being roughened on their respective surfaces facing said liner sleeves for positive gripping engagement therewith.

28. A clamp fitting for a force-transmitting system wherein a cylindrical, open-ended tube is used as the force-transmitting member, said fitting comprising a rigid metal tubular coupling sleeve with an interior surface which is cylindrical and internally threaded at one end region of said coupling sleeve and the remainder of which is conical and decreases in diameter in the direction away from said cylindrical portion, a plurality of elongated wedge-shaped elements of circularly arcuate cross section extending axially along and in side-by-side configuration interiorly of said conical surface portion of said coupling sleeve, said elements decreasing in thickness in the direction away from said cylindrical surface portion of said coupling sleeve and conjointly defining a split tubular structure having a cylindrical interior configuration and a conical exterior configuration in sliding engagement with said conical surface portion of said coupling sleeve, said elements being radially keyed to said coupling sleeve against rotational relative movement therebetween, a rigid metal cylinder coaxial with said tubular structure and having a first section located interiorly of the latter, said first cylinder section and said tubular structure defining therebetween an annular space adapted to receive the open end region of said tube, said cylinder further having a second section of enlarged diameter extending from one end of said first cylinder section and located within the confines of said internally threaded portion of said coupling sleeve and providing an annular shoulder adapted to serve as an abutment for the open end edge of said tube, said cylinder further having a radially outwardly extending rigid flange secured to said second cylinder section remote from said shoulder and overlying the open end of said internally threaded portion of said coupling sleeve, said flange having at least one opening therethrough to provide access into the annular space defined within said coupling sleeve between said second cylinder section and said cylindrical surface of said coupling sleeve, and an annular screw arranged coaxially about said second cylinder section within the confines of and screwed into said internally threaded portion of said coupling sleeve, said screw being provided with means engageable by a tool when the same is extended through said opening in said flange to enable said coupling sleeve, upon rotation of said screw relative thereto in the appropriate direction, to be pulled toward said flange for displacing said elements radially inwardly toward said cylinder whereby upon application of said force to said coupling sleeve and said flange, stress can be transferred simultaneously but independently into the inside and outside surfaces of a tube clamped between said cylinder and said elements.

29. A clamp fitting according to claim 28, both said coupling sleeve and said flange having an external hexagonal configuration adapted to coact with a corresponding internal configuration of a force-applying means.

30. A clamp fitting according to claim 28, both said coupling sleeve and said flange having an external splined configuration adapted to coact with a corresponding internal configuration of a force-applying means.

31. A clamp fitting according to claim 28, both said coupling sleeve and said flange having an external threaded configuration adapted to coact with a corresponding internal configuration of a force-applying means.

32. A clamp fitting according to claim 31, further comprising a pair of substantially coextensive, circumferentially continuous, cylindrical, stress transfer distributing layers of elastomeric material adapted to be bonded to the inner and outer surfaces, respectively, of said tube, each of said layers being of uniform thickness throughout its entire expanse, and a deformable metal liner sleeve adapted to be bonded to the outer surface of the outer elastomer layer, said elements being roughened on their respective inwardly directed surfaces for positive gripping engagement with said liner sleeve.